(No Model.)

P. HUMBERT.
Three Wheeled Vehicle.

No. 236,224. Patented Jan. 4, 1881.

WITNESSES:
C. Neveux
C. Sedgwick

INVENTOR:
P. Humbert
BY Munn & Co
ATTORNEYS.

N. PETERS, PHOTO-LITHOGRAPHER, WASHINGTON, D. C.

UNITED STATES PATENT OFFICE.

PROSPER HUMBERT, OF AUSTIN, TEXAS.

THREE-WHEELED VEHICLE.

SPECIFICATION forming part of Letters Patent No. 236,224, dated January 4, 1881.

Application filed June 15, 1880. (No model.)

*To all whom it may concern:*

Be it known that I, PROSPER HUMBERT, of Austin, in the county of Travis and State of Texas, have invented a new and Improved Vehicle, of which the following is a specification.

The object of this invention is to construct a three-wheeled vehicle having one or more seats, the forward one of which shall always turn with the horses, so that the driver shall at all times be directly in rear of the horses and hold the reins at the same lengths, however much the horses may turn to either side.

Figure 1:
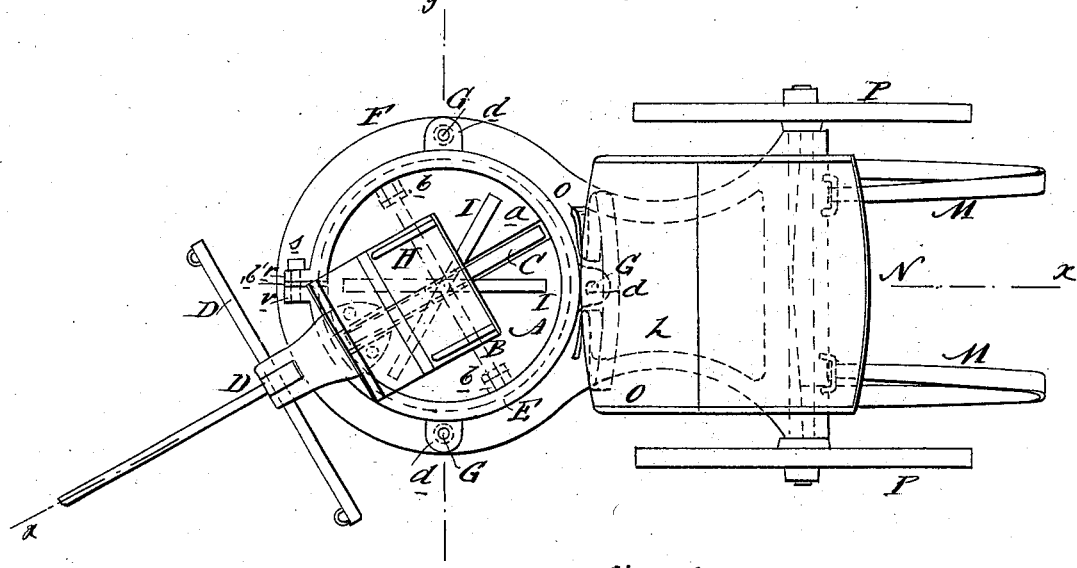
Figure 2:
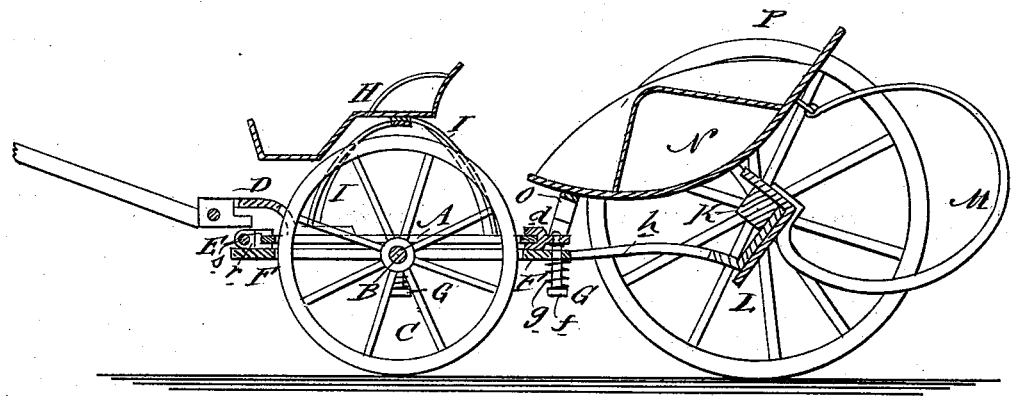
Figure 3:
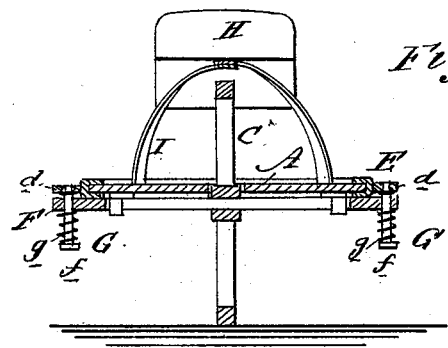

Figure 1 is a plan of the device, showing the driver's seat and front wheel turned at an angle from the body of the vehicle. Fig. 2 is a vertical side elevation of the same on line $x\,x$, Fig. 1. Fig. 3 is a transverse sectional elevation on line $y\,y$, Fig. 1.

Similar letters of reference indicate corresponding parts.

In the drawings, A represents the revolving plate, provided with a central fore-and-aft slot, $a$.

B is the axle of the front wheel, C, journaled in the boxes $b\,b$, that project downward from the under face of the plate A, the wheel C projecting upward through the slot $a$, as shown.

D represents the clip and pole of the vehicle, attached to the front edge of the plate A, and D' represents the double-tree.

E is an inwardly-grooved or semi-tubular ring embracing the edge of the plate A, and in which the said plate A revolves, said ring E being jointed at $b'$, and being drawn together around the edge of the plate A by means of the screw $s$, which passes laterally through the lugs $r\,r$, and being provided with lateral lugs $d\,d$, by means of which it is secured upon the circular flat plate F, which constitutes a portion of the vehicle-frame.

G G are the three bolts or screws, provided with nuts $f$, that hold the ring E and plate F together by passing through the lugs $d\,d$ and the said plate F, said screws or bolts G G being encircled with spiral springs $g\,g$, whose tension serves to maintain the ring E and the plate F in proper contact, while by turning the nuts $f\,f$ this contact may be increased or diminished at will.

H is the front seat, supported over the wheel C on the springs I I, that rise from the revolving plate A.

The circular flat plate F is continued rearward, and has its rear end bent upward at right angles, or at a slightly obtuse angle, and secured upon the rear axle, K, said plate F being preferably cut away, as shown at $h$, to remove unnecessary weight.

L is an angle-iron extending along the axle K and overlapping the upward bent edge of the plate F, and being fastened thereto, and to the axle K, strengthens the vehicle, while it serves also to support the lower ends of the springs M M, which help support the rear seat or body, N, of the vehicle, said springs M M being connected with the back of said body N, while the front of said body N rests on the spring O, which extends transversely across the plate F.

P P represent the hind wheels of the vehicle.

This vehicle has an advantage over a four-wheeled vehicle in dispensing with one wheel and one or more springs. It is more readily turned than a four-wheeled vehicle, and can more easily avoid collision with other vehicles when in motion. It also offers better facilities for entering and leaving the carriage, and a vehicle of this design and of equal strength with a four-wheeled vehicle will weigh from twenty to fifty pounds less than the latter.

I do not confine myself to the precise construction of the parts of the vehicle as herein shown and described, as they may be considerably modified without departing from my invention.

Having thus fully described my invention, I claim as new and desire to secure by Letters Patent—

1. The slotted plate A $a$, carrying pole-clip and journal-boxes for axle, in combination with the inwardly-grooved ring E, embracing said plate and having lugs $d$, and the plate F on the frame, as and for the purpose specified.

2. The combination, with the plate A, ring E, and plate F, of the spring-bolts G G, substantially as herein shown and described, whereby said ring E and plates A F are relatively adjusted, as set forth.

3. In a vehicle, the combination, with the axle K and angle-iron L, of the plate F, substantially as herein shown and described.

4. The combination, with the axle K, angle-iron L, and plate F, of the body N and springs M M O, substantially as herein shown and described.

PROSPER HUMBERT.

Witnesses:
L. WEBER,
JULIEN PRADE.